(12) United States Patent
Stamper

(10) Patent No.: US 8,528,397 B2
(45) Date of Patent: Sep. 10, 2013

(54) HERMETICITY SENSOR AND RELATED METHOD

(75) Inventor: Anthony K. Stamper, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 12/858,961

(22) Filed: Aug. 18, 2010

(65) Prior Publication Data
US 2012/0042714 A1    Feb. 23, 2012

(51) Int. Cl.
*G01L 5/00* (2006.01)

(52) U.S. Cl.
USPC ........................................ 73/152.59; 116/275

(58) Field of Classification Search
USPC ...................................... 73/152.59; 116/275
See application file for complete search history.

(56) References Cited

U.S. PATENT DOCUMENTS

| | | | |
|---|---|---|---|
| 3,797,313 | A | 3/1974 | Renholts |
| 6,460,234 | B1 * | 10/2002 | Gianchandani .............. 29/25.35 |
| 6,797,631 | B2 | 9/2004 | Kim et al. |
| 6,935,165 | B2 | 8/2005 | Bashir et al. |
| 7,129,163 | B2 * | 10/2006 | Sherrer et al. ................ 438/637 |
| 7,368,312 | B1 | 5/2008 | Kranz et al. |
| 7,373,819 | B2 | 5/2008 | Engler et al. |
| 7,412,899 | B2 | 8/2008 | Mian et al. |
| 7,495,368 | B2 | 2/2009 | Gogoi et al. |
| 7,508,065 | B2 * | 3/2009 | Sherrer et al. ................ 257/704 |
| 7,595,209 | B1 * | 9/2009 | Monadgemi et al. .......... 438/51 |
| 8,148,790 | B2 * | 4/2012 | Morris et al. ................. 257/415 |

OTHER PUBLICATIONS

Chen et al., "Microfabrication and Characterization of SiO2 Microcantilever for High Sensitive Moisture Sensor", IEEE Sensors 2007 Conference.
Govardhan, et al., "Mems Based Humidity Sensor", Proceedings of International Conference on Smart Materials Structures and Systems, Jul. 28-30, 2005, Bangalore, India.
"Hygrometrix Launches HMX2000-HT MEMS Humidity Sensor", EE Times, 31/27/2005.
Lee et al., "Micromachine-based humidity sensors with integrated temperature sensors for signal drift compensation", Journal of Micromechanics and Microengineering, 13, 2003, 620-627.

* cited by examiner

*Primary Examiner* — Hezron E Williams
*Assistant Examiner* — Rodney T Frank
(74) *Attorney, Agent, or Firm* — Richard M. Kotulak; Hoffman Warnick LLC

(57) ABSTRACT

A hermeticity sensor for a device includes a beam positioned within a substantially hermetically sealed cavity. The beam includes a stress that changes in response to being exposed to ambient from outside the cavity. A related method is also provided.

18 Claims, 4 Drawing Sheets

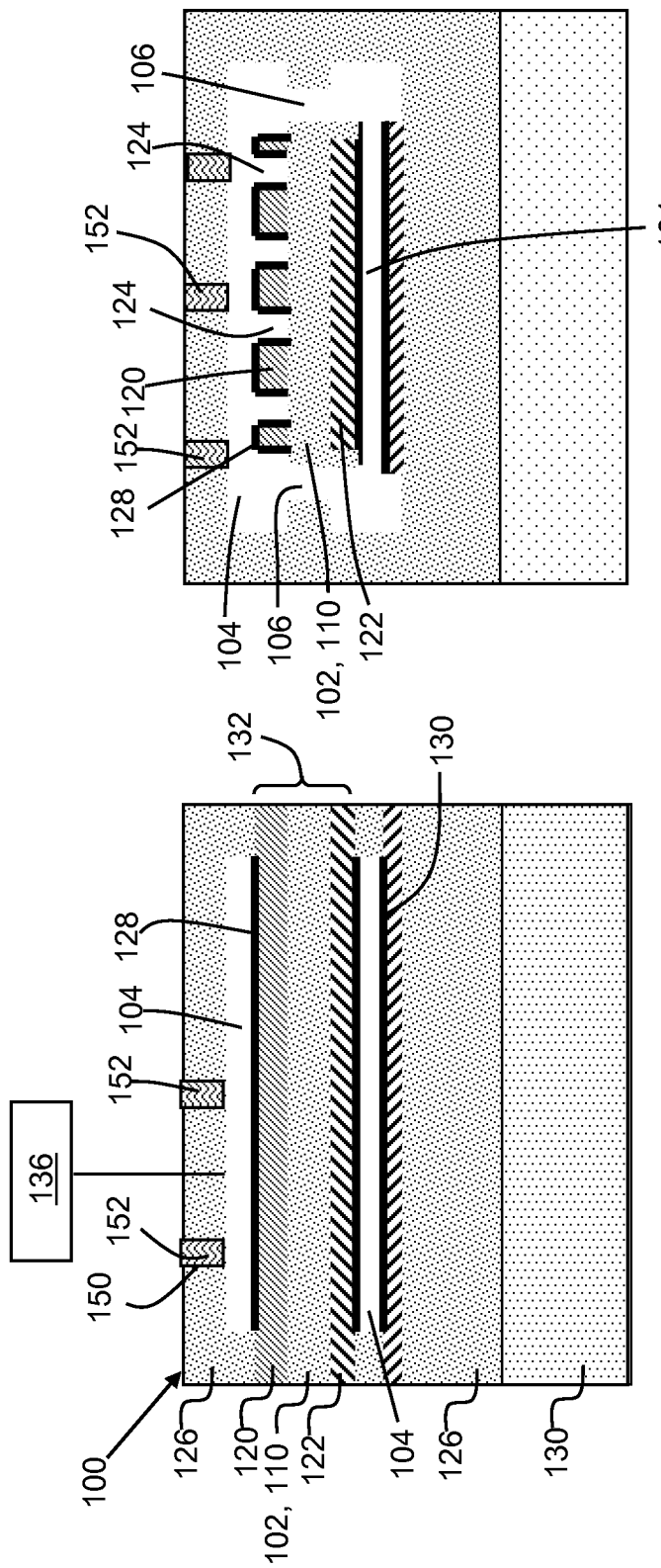

HERMETICITY SENSOR AND RELATED METHOD

BACKGROUND

1. Technical Field

The disclosure relates generally to micro electro-mechanical systems (MEMS), and more particularly, to a MEMS-based hermeticity sensor.

2. Background Art

In electronic devices, it is oftentimes beneficial to monitor exposure to moisture, and in particular, whether a hermetic seal about an electronic device is no longer sealed.

BRIEF SUMMARY

A first aspect of the disclosure provides a hermeticity sensor for a device, the hermeticity sensor comprising: a beam positioned within a substantially hermetically sealed cavity, the beam including a stress that changes in response to being exposed to ambient from outside the cavity.

A second aspect of the disclosure provides a method of sensing a hermeticity of a device, the method comprising: placing a beam within a cavity, the beam including a stress that changes from tensile to compressive in response to being exposed to ambient; substantially hermetically sealing the cavity; and monitoring the beam to sense the hermeticity of the device.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 1 shows a cross-sectional view of a hermeticity sensor according to embodiments of the invention.

FIG. 2 shows a cross-sectional view of a hermeticity sensor according to embodiments of the invention.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As indicated above, the disclosure provides a hermeticity sensor 100 for a device such as an integrated circuit or related electronic circuit. Hermeticity sensor 100 includes a micro-electro-mechanical (MEMS) beam that in contrast to known devices senses hermeticity in terms of physical deflection of the beam. As will be described, the deflection can be sensed in a number of ways including a change in capacitance caused by the deflection of the beam (not a change in capacitance of material therein) and/or a change in distance of the beam from an initial reference point measured by an optical measurement system that is not part of the beam.

Figure 3:
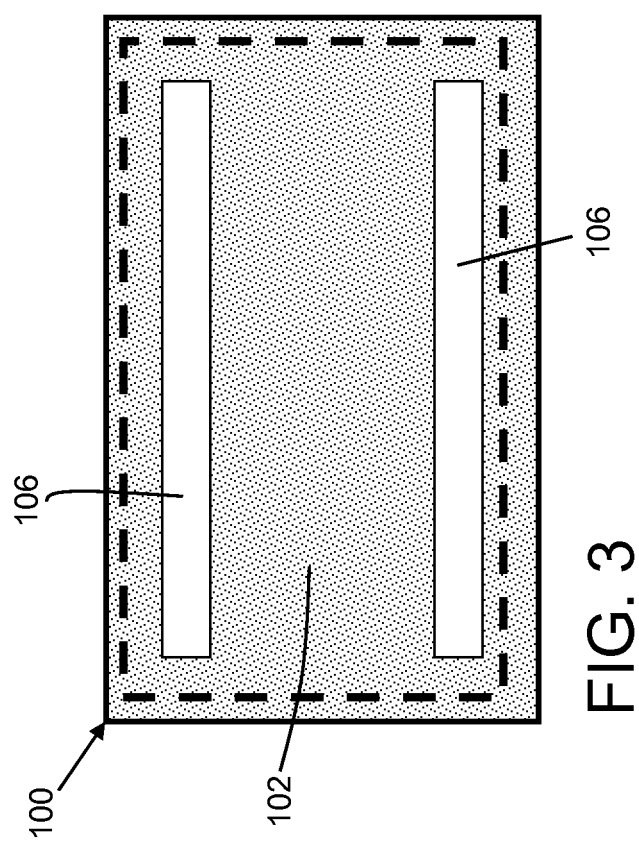
FIG. 3 shows a plan view of a hermeticity sensor according to embodiments of the invention.

FIG. 1 shows one cross-sectional view of hermeticity sensor 100 and FIG. 2 shows another cross-sectional view of hermeticity sensor 100. Although this hermeticity sensor consists of a bridge MEMS beam, the methods and structures discussed also apply to a cantilever MEMS beam. As illustrated, hermeticity sensor 100 includes a beam 102 positioned within a substantially hermetically sealed cavity 104. Cavity 104 extends across upper and lower sides of beam 102, and, as shown in FIG. 2, through vias 106 about opposite sides of beam 102. Consequently, as shown in FIG. 2, beam 102 bridges cavity 104 and includes at least four sides exposed to the cavity. FIG. 3 shows a plan view of hermeticity sensor 100 through beam 102 in FIG. 2. As will be described herein, beam 102 includes a stress that changes in response to being exposed to ambient from outside cavity 104. The ambient may include any environment that is sufficiently dissimilar in terms of humidity from that in cavity 104 to cause a stress change in beam 102. That is, the stress within beam 102 is changed by exposure to ambient and the hermeticity of cavity 104 changes.

In one embodiment, beam 102 includes a dielectric layer 110, e.g., silicon oxide ($SiO_2$), which absorbs water when exposed to humidity with a subsequent change in surface film stress. One example of a dielectric layer which absorbs water would be a 400° C. plasma enhanced chemical vapor deposited (PECVD) or sub-atmospheric CVD (SACVD) $SiO_2$ with tensile stress. PECVD $SiO_2$ can be made tensile by reducing the RF power or increasing the tetraethyl orthosilicate (TEOS) flow, as known in the art. Other materials, such as fluorinated silica glass (FSG) or fluorine-doped $SiO_2$ also are known to absorb water on exposed surfaces. In this case, a first metal layer 120 may be positioned on a first side of tensilely stressed dielectric layer 110, and a second metal layer 122 may be positioned on a second side of tensilely stressed dielectric layer 110. First and second metal layer 120, 122 may include a metal such as: aluminum-copper (AlCu), copper (Cu), aluminum (Au), etc. As shown in FIG. 2, at least one vent opening 124 may be provided through at least one of first metal layer 120 (as shown) and second metal layer 122 to tensilely stressed dielectric layer 110 to provide increased exposure of beam 102 to any change in the hermeticity of cavity 104.

Other layers in hermeticity sensor 100 may include a dielectric 126 and any appropriate liners 128 (dark thin lines in drawings) for metal layers 120, 122. Dielectric 126 may include any now known or later developed interlayer dielectric such as but not limited to: silicon nitride ($Si_3N_4$), silicon oxide ($SiO_2$), fluorinated $SiO_2$ (FSG), hydrogenated silicon oxycarbide (SiCOH), porous SiCOH, boro-phospho-silicate glass (BPSG), silsesquioxanes, carbon (C) doped oxides (i.e., organosilicates) that include atoms of silicon (Si), carbon (C), oxygen (O), and/or hydrogen (H), thermosetting polyarylene ethers, SiLK (a polyarylene ether available from Dow Chemical Corporation), a spin-on silicon-carbon containing polymer material available from JSR Corporation, other low dielectric constant (<~3.9) material, or layers thereof. Liners 128 may include any now known or later developed refractory metal such as but not limited to: ruthenium, tantalum (Ta), titanium (Ti), tungsten (W), iridium (Ir), rhodium (Rh) and platinum (Pt), etc., or mixtures of thereof.

In one embodiment, tensilely stressed dielectric layer 110 has a thickness greater than a thickness of each of first metal layer 120 and second metal layer 122 to, for example, reduce temperature-induced beam bending. For example, a coefficient of thermal expansion (CTE) of the metal may be approximately 24 ppm/K, while that of oxide may be approximately 0.5 ppm/K (the Young's modulus of oxide and metal are similar). A vertical stress gradient in tensilely stressed dielectric layer 110 can either cause beam bending or be used to control beam bending. Initially, tensiley stressed dielectric layer 110 ideally does not include any vertical stress gradient. Pre-release bending is constrained by a substrate 130, e.g., an approximately 700 μm silicon wafer.

Figure 4:
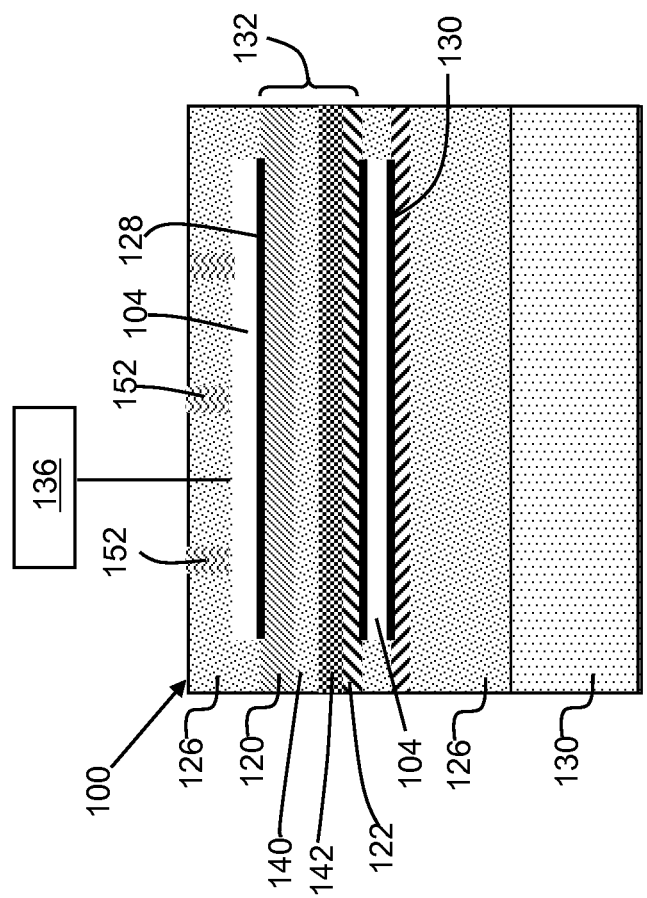
FIG. 4 shows a cross-sectional view of a hermeticity sensor according to another embodiment of the invention.

In another embodiment, shown in FIG. 4, beam 102 may include a tensiley stressed silicon oxide that includes a first silicon oxide layer 140 over a second silicon oxide layer 142. That is, metal layers 120, 122 (FIGS. 1-2) are not used. In this case, first silicon oxide layer 140 may be as-deposited tensiley stressed, or first silicon oxide layer 140 may have a Young's modulus that is greater than second silicon oxide layer 142. First silicon oxide layer 140 may also include a compressively stressed silicon oxide so as to provide stress tailoring and/or stability of second silicon oxide layer 142.

Figure 5:
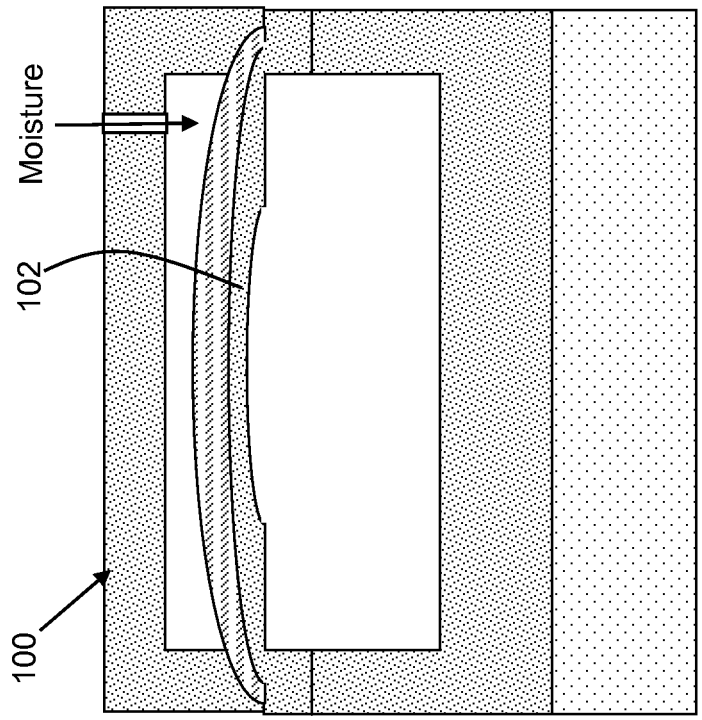
FIGS. 5 and 6 show one embodiment of a beam of the hermeticity sensor under different stress levels.
Figure 6:
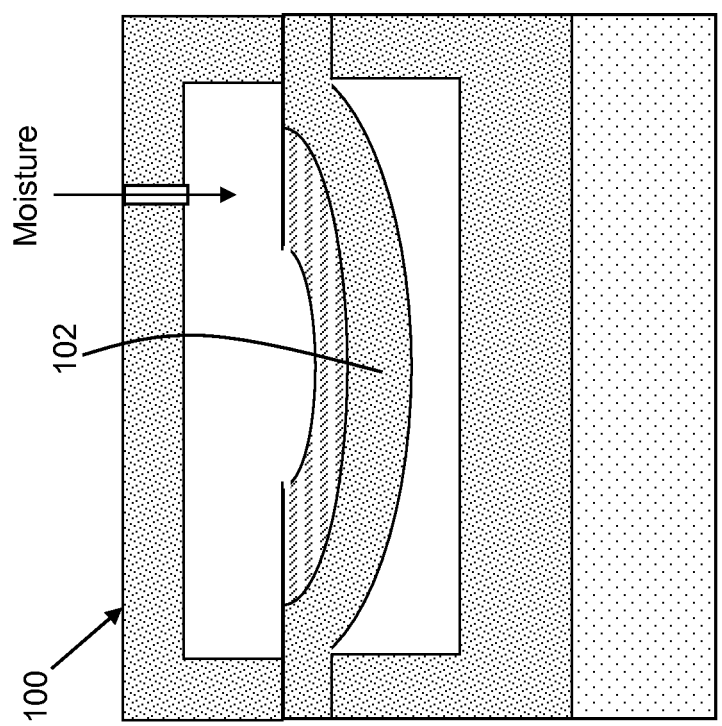

In operation, beam 102 changes stress to one of a less tensile state or a compressive state in response to being exposed to ambient from outside cavity 104. Again, the ambient may include any environment that is sufficiently dissimilar in terms of humidity from that in cavity 104 to cause a stress change in beam 102. In this case, as shown in FIGS. 5 and 6 in an exaggerated manner, the change in stress may create a deflection change in beam 102, e.g., from being flat to convex or concave, or concave to flat or convex, or convex to flat or concave.

Hermeticity sensor 100 may measure the change in stress and/or resulting deflection in a number of ways. In one embodiment, as shown in FIGS. 1 and 2, a first capacitor plate 130 may be positioned a distance from beam 102, and beam 102 may constitute a second capacitor plate 132, e.g., via first and second metal layers 120, 122. As illustrated, a lower part of cavity 104 acts to distance first capacitor plate 130 from second capacitor plate 132. It is understood, however, that other structure, e.g., liners, dielectric layers, etc., may be present to further distance the plates. Appropriate contacts (not shown) may be made to each capacitor plate 130, 132 in a known fashion. Here, a deflection of beam 102 created by the change in stress changes a capacitance value between first capacitor plate 130 and second capacitor plate 132 is indicative of the hermeticity of the device. Note, the capacitance change is caused by the deflection and not by a change in the capacitance value of any part of beam 102.

In another embodiment, also shown in FIG. 1, hermeticity sensor 100 may include an optical measurer 136 configured to measure an amount of deflection in beam 102 caused by the change in the stress. That is, optical measurer 136 measures the change in distance of beam 102 from an initial reference point measured thereby, and is not measuring an electrical attribute of beam 102 such as capacitance or resistance. Optical measurer 136 may include any now known or later developed system configured to optically measure an amount of deflection in beam 102 caused by a change in a stress in beam 102, e.g., as a distance between a sensor of measurer 136 and a surface of beam 102. For example, optical measurer 134 may employ infrared, laser, etc., technology.

In terms of operation, one embodiment of the invention includes a method of sensing a hermeticity of a device using hermeticity sensor 100. In this case, a method may include placing beam 102 within cavity 104. As described above, beam 102 may include a stress that changes to a lesser tensile or compressive stress in response to being exposed to ambient. Beam 102 may be formed using any now known or later developed MEMS manufacturing techniques, e.g., material deposition, masking, patterning, etching, etc. Although not necessary in all cases, in one example, beam 102 in the form of tensiley stressed silicon oxide may be deposited at approximately 400° C., which ensures the silicon oxide includes a tensile stress. In one example, cavity 104 can be initially formed using a removable material such as silicon. The silicon can be removed to form a cavity using openings 150 (FIG. 1) by, for example, exposing it to a $XeF_2$ gas, as known in the art. The resulting cavity openings are sealed off to form a hermitic seal and the wafer is heated during the sealing process to drive off moisture prior to substantially hermetically sealing cavity 104 using plugs 152 (FIG. 1), e.g., of a dielectric or metal. Monitoring beam 102, as described herein, senses the hermeticity of the device.

To illustrate operation, a few examples are now provided. In one example, a beam 102 has approximately 0.5 μm thick metal layers 120, 122 over and under approximately a 2 μm thick silicon oxide layer 110 with approximately 80 MPa tensile stress therein as-deposited. Cavity 104 is approximately 2 μm on either side of beam 102. Where beam 102 was without vents 124 (FIG. 2), it had a deflection of −325 nm (slightly concave, indicative of initial tensile stress) when substantially hermetically sealed. After approximately 14 days exposure to an ambient having 60% relative humidity, silicon oxide layer 110 had a measured compressive stress of approximately −100 MPa, and a deflection of 6400 nm. That is, beam 102 turned convex, indicative of less tensile or compressive stress, like in FIG. 6. In another example, the same beam 102 was provided with 1 μm vents 124 (FIG. 2). In this case, it initially had a deflection of −276 nm (slightly concave, indicative of initial tensile stress) when substantially hermetically sealed, and a deflection of 7500 nm (convex, indicative of less tensile or compressive stress, like in FIG. 6) when the hermeticity is lost. Another example of the beam had approximately 0.8 μm vents 124 (FIG. 2) with an initial deflection of 297 nm (slightly convex, indicative of initial tensile stress) when substantially hermetically sealed, and a deflection of 5100 nm (convex, indicative of less tensile or compressive stress, like in FIG. 6) when the hermeticity was lost. It is emphasized that while the disclosure provides the above examples, other beams may be provided within the scope of the invention having different dimensions, vent size, thicknesses, etc.

The method as described above is used in the fabrication of MEMS devices and/or integrated circuit chips. The resulting devices and/or IC chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip may then be integrated with other chips, discrete circuit elements, and/or other signal processing devices as part of either (a) an intermediate product, such as a motherboard, or (b) an end product. The end product can be any product that includes MEMS and/or IC chips, ranging from cell phones, toys and other low-end applications to advanced computer products having a display, a keyboard or other input device, and a central processor.

The foregoing drawings show some of the processing associated according to several embodiments of this disclosure. It should be noted that in some alternative implementations, the acts noted may occur out of the order noted or, for example, may in fact be executed substantially concurrently or in the reverse order, depending upon the act involved. Also, one of ordinary skill in the art will recognize that additional acts may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A hermeticity sensor for a device, the hermeticity sensor comprising:
   a beam positioned within a substantially hermetically sealed cavity, the beam including a stress that changes in response to being exposed to ambient from outside the cavity,
   wherein the beam includes:
   a tensilely stressed dielectric layer;
   a first metal layer on a first side of the tensilely stressed dielectric layer;
   a second metal layer on a second side of the tensilely stressed dielectric layer; and
   at least one vent opening through at least one of the first metal layer and the second metal layer to the tensilely stressed dielectric layer,
   wherein the tensilely stressed dielectric layer changes stress to one of a less tensile state or a compressive state in response to being exposed to ambient from outside the cavity.

2. The hermeticity sensor of claim 1, wherein the change in stress creates a deflection change in the beam.

3. The hermeticity sensor of claim 1, wherein the tensiley stressed dielectric layer includes a tensiley stressed silicon oxide.

4. The hermeticity sensor of claim 3, wherein the tensiley stressed silicon dioxide layer includes a first silicon oxide layer over a second silicon oxide layer.

5. The hermeticity sensor of claim 1, wherein the change to one of the less tensile state and the compressive state, resulting in a change in beam deflection.

6. The hermeticity sensor of claim 1, wherein the tensilely stressed dielectric layer includes silicon oxide.

7. The hermeticity sensor of claim 1, wherein the beam bridges the cavity and includes at least four sides exposed to the cavity.

8. The hermeticity sensor of claim 1, further comprising:
   a first capacitor plate positioned a distance from the beam, wherein the beam constitutes a second capacitor plate,
   wherein deflection of the beam created by the change in stress changes a capacitance value between the first capacitor plate and the second capacitor plate indicative of the hermeticity of the device.

9. The hermeticity sensor of claim 1, further comprising an optical measurer configured to measure an amount of deflection in the beam caused by the change in the stress.

10. The hermeticity sensor of claim 1, wherein the tensilely stressed dielectric layer has a thickness greater than a thickness of each of the first metal layer and the second metal layer.

11. A method of sensing a hermeticity of a device, the method comprising:
    placing a beam within a cavity, the beam including a stress that changes from tensile to compressive in response to being exposed to ambient, the placing including providing the beam with:
    a tensilely stressed dielectric layer,
    a first metal layer on a first side of the tensilely stressed dielectric layer,
    a second metal layer on a second side of the tensilely stressed dielectric layer, and
    at least one vent opening through at least one of the first metal layer and the second metal layer to the tensilely stressed dielectric layer;
    wherein the monitoring includes monitoring changes in the stress in response to being exposed to ambient to sense the hermeticity of the device;
    substantially hermetically sealing the cavity; and
    monitoring the beam to sense the hermeticity of the device.

12. The method of claim 11, wherein the tensilely stressed dielectric layer includes a tensily stressed silicon oxide.

13. The method of claim 12, wherein the tensilely stressed silicon oxide layer includes a first silicon oxide layer over a second silicon oxide layer.

14. The method of claim 11, wherein the tensiley stressed dielectric layer has a thickness greater than a thickness of each of the first metal layer and the second metal layer.

15. The method of claim 11, further comprising:
    placing a first capacitor plate a distance from the beam, wherein the beam constitutes a second capacitor plate,
    wherein the monitoring includes monitoring a capacitance value between the first capacitor plate and the second capacitor plate to sense the hermeticity of the device.

16. The method of claim 11, wherein the monitoring includes using an optical measurer configured to measure an amount of deflection in the beam caused by a change in a stress in the beam.

17. The method of claim 11, wherein the change in stress from tensile to compressive creates a deflection change in the beam.

18. A method of sensing a hermeticity of a device, the method comprising:
    placing a beam within a cavity, the beam including a stress that changes from tensile to compressive in response to being exposed to ambient;
    substantially hermetically sealing the cavity; and
    monitoring the beam to sense the hermeticity of the device,
    wherein the beam bridges the cavity and includes at least four sides exposed to the cavity.

* * * * *